United States Patent
Noh

(10) Patent No.: US 8,197,155 B2
(45) Date of Patent: Jun. 12, 2012

(54) CONNECTING DEVICE OF PARKING CABLE FOR ELECTRIC PARKING BRAKE

(75) Inventor: Kang Sung Noh, Gyeonggi-do (KR)

(73) Assignee: Mando Corporation, Gyeonggi-Do (KR)

(*) Notice: Subject to any disclaimer, the term of this patent is extended or adjusted under 35 U.S.C. 154(b) by 182 days.

(21) Appl. No.: 12/367,344

(22) Filed: Feb. 6, 2009

(65) Prior Publication Data

US 2009/0208281 A1 Aug. 20, 2009

(30) Foreign Application Priority Data

Feb. 20, 2008 (KR) .................. 10-2008-0015323

(51) Int. Cl.
*F16B 21/02* (2006.01)
*F16C 1/22* (2006.01)
*F16D 65/14* (2006.01)

(52) U.S. Cl. ........ 403/348; 403/166; 403/304; 403/349; 188/2 D; 74/502.6

(58) Field of Classification Search .................. 403/166, 403/304, 348, 349, 353, 359.3, 359.4; 74/502.6; 188/2 D, 156–158, 265

See application file for complete search history.

(56) References Cited

U.S. PATENT DOCUMENTS

| | | | | |
|---|---|---|---|---|
| 2,337,402 A | * | 12/1943 | Mills ............................... | 279/83 |
| 2,503,553 A | * | 4/1950 | Hollins ....................... | 340/457.3 |
| 3,423,781 A | * | 1/1969 | Henson ........................... | 15/145 |
| 4,176,815 A | * | 12/1979 | Davidson et al. ............. | 248/589 |
| 5,094,464 A | * | 3/1992 | Musacchia, Sr. ............. | 473/582 |
| 5,180,284 A | * | 1/1993 | Monrose et al. .......... | 416/204 R |

(Continued)

FOREIGN PATENT DOCUMENTS

KR 10-1999-0019245 3/1999

(Continued)

OTHER PUBLICATIONS

Chinese Office Action, issued in Chinese Patent Application No. 200910004915.9, dated Oct. 26, 2011.

*Primary Examiner* — Victor MacArthur
(74) *Attorney, Agent, or Firm* — McDermott Will & Emery LLP

(57) ABSTRACT

Disclosed is a connecting device of a parking cable for an electric parking brake, which connects an actuator for the electric parking brake with a parking cable. The connecting device includes a connector and a reaction force member. The connector includes a small diameter section having one side into which an outer peripheral surface of the parking brake is inserted, a large diameter section that extends from the small diameter section to have a diameter larger than that of the small diameter section, an axial cutout slit axially formed through upper and lower surfaces of an outer peripheral portion of the large diameter section such that protrusions circumferentially protruding from the actuator are inserted into the axial cutout slit through the large diameter section, a circumferential cutout slit that extends from an inner end of the axial cutout slit in a circumferential direction, and a cutout groove that axially extends from the circumferential cutout slit. The reaction force member is inserted into the large diameter section to press the protrusions such that the protrusions are seated in the cutout groove through the axial cutout slit and the circumferential cutout slit. According to the connecting device, the assembly work is facilitated, so the assembly efficiency can be improved and connection work using the connector can be easily performed.

3 Claims, 4 Drawing Sheets

U.S. PATENT DOCUMENTS

| | | | | |
|---|---|---|---|---|
| 5,377,789 A * | 1/1995 | Brooks et al. | | 188/2 D |
| 5,513,622 A * | 5/1996 | Musacchia, Sr. | | 124/89 |
| 5,538,116 A * | 7/1996 | Parker et al. | | 188/2 D |
| 5,655,415 A * | 8/1997 | Nagle et al. | | 74/502.6 |
| 5,713,765 A * | 2/1998 | Nugent | | 439/700 |
| 5,823,063 A * | 10/1998 | Nagle et al. | | 74/502.6 |
| 5,868,533 A * | 2/1999 | Fiala | | 408/226 |
| 6,029,535 A * | 2/2000 | Kenny et al. | | 74/473.3 |
| 7,115,119 B2 * | 10/2006 | Desarzens | | 606/1 |
| 7,153,153 B1 * | 12/2006 | Conroy et al. | | 439/314 |
| 7,168,201 B2 * | 1/2007 | Markley et al. | | 43/18.1 CT |
| 7,484,982 B1 * | 2/2009 | Royle | | 439/311 |
| 7,669,501 B2 * | 3/2010 | Rothe | | 74/501.5 R |
| 2006/0156981 A1 * | 7/2006 | Fondurulia et al. | | 118/715 |
| 2010/0078273 A1 * | 4/2010 | Kim | | 188/156 |
| 2010/0078274 A1 * | 4/2010 | Christopher Jackson et al. | | 188/265 |
| 2011/0024243 A1 * | 2/2011 | Choi | | 188/158 |
| 2011/0073423 A1 * | 3/2011 | Moon | | 188/2 D |

FOREIGN PATENT DOCUMENTS

| | | |
|---|---|---|
| KR | 10-2006-0002268 | 1/2006 |

* cited by examiner

CONNECTING DEVICE OF PARKING CABLE FOR ELECTRIC PARKING BRAKE

CROSS-REFERENCE TO RELATED APPLICATIONS

This application claims the benefit of Korean Patent Application No. 10-2008-0015323, filed on Feb. 20, 2008, in the Korean Intellectual Property Office, the disclosure of which is incorporated herein by reference.

BACKGROUND OF THE INVENTION

1. Field of the Invention

The present invention relates to a parking cable for an electric parking brake. More particularly, the present invention relates to a connecting device of a parking cable for an electric parking brake, used for assembling an electric parking brake assembly and a parking cable assembly in a vehicle in a state in which the electric parking brake assembly and the parking cable assembly are separately assembled.

2. Description of the Prior Art

Recently, a parking brake system such as an electronic parking brake (EPB), which automatically operates according to an operation state of a vehicle without manual manipulation of a driver, has been developed.

According to such an electronic parking brake, the parking brake automatically operates if a vehicle does not move for predetermined time, and the parking brake is automatically released if the vehicle starts.

To this end, various sensors detect an operation state of the vehicle and an electronic control unit controls an operation related to automatic control of the parking brake according to information detected by the sensors.

In order to operate the electronic parking brake, a motor pulls or releases a cable that operates a rear wheel brake assembly. The electronic control unit controls an operation of the motor.

In this regard, a motor driven parking brake is provided to pull or release the cable.

However, since a parking cable assembly is connected with the motor driven parking brake, the parking cable assembly, which is assembled separately from a parking brake assembly, cannot be connected with the motor driven parking brake in a state in which the parking brake assembly has been assembled. In other words, since the parking cable assembly is integrally connected with an actuator such as a motor of the motor driven parking brake, assembly work may be difficult.

SUMMARY OF THE INVENTION

Accordingly, it is an aspect of the present invention to provide a connecting device of a parking cable for an electric brake, which can connect an actuator of an electric parking brake with a parking cable by using a connector.

Additional aspects and/or advantages of the invention will be set forth in part in the description which follows and, in part, will be apparent from the description, or may be learned by practice of the invention.

The foregoing and/or other aspects of the present invention are achieved by providing a connecting device of a parking cable for an electric parking brake, which connects an actuator for the electric parking brake with a parking cable, the connecting device comprising a connector and a reaction force member. The connector comprises a small diameter section having one side into which an outer peripheral surface of the parking brake is inserted, a large diameter section that extends from the small diameter section to have a diameter larger than that of the small diameter section, an axial cutout slit axially formed through upper and lower surfaces of an outer peripheral portion of the large diameter section such that protrusions circumferentially protruding from an outer peripheral surface of an end of the actuator are inserted into the axial cutout slit through one side of the large diameter section, a circumferential cutout slit that extends from an inner end of the axial cutout slit by a predetermined length in a circumferential direction, and a cutout groove that axially extends from the circumferential cutout slit. The reaction force member is inserted into the large diameter section of the connector to press the protrusions of the actuator such that the protrusions are seated in the cutout groove through the axial cutout slit and the circumferential cutout slit.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Hereinafter, the present invention will be described in detail with reference to accompanying drawings.

Figure 1:
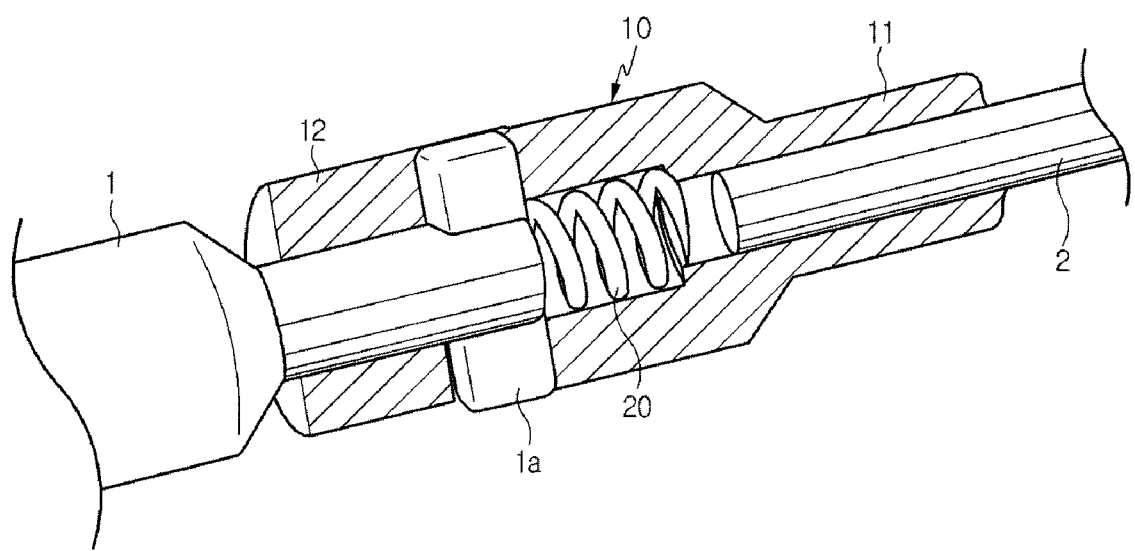
FIG. 1 is an exploded perspective view illustrating a connecting device of a parking cable for an electric parking brake according to the present invention.
Figure 2A:
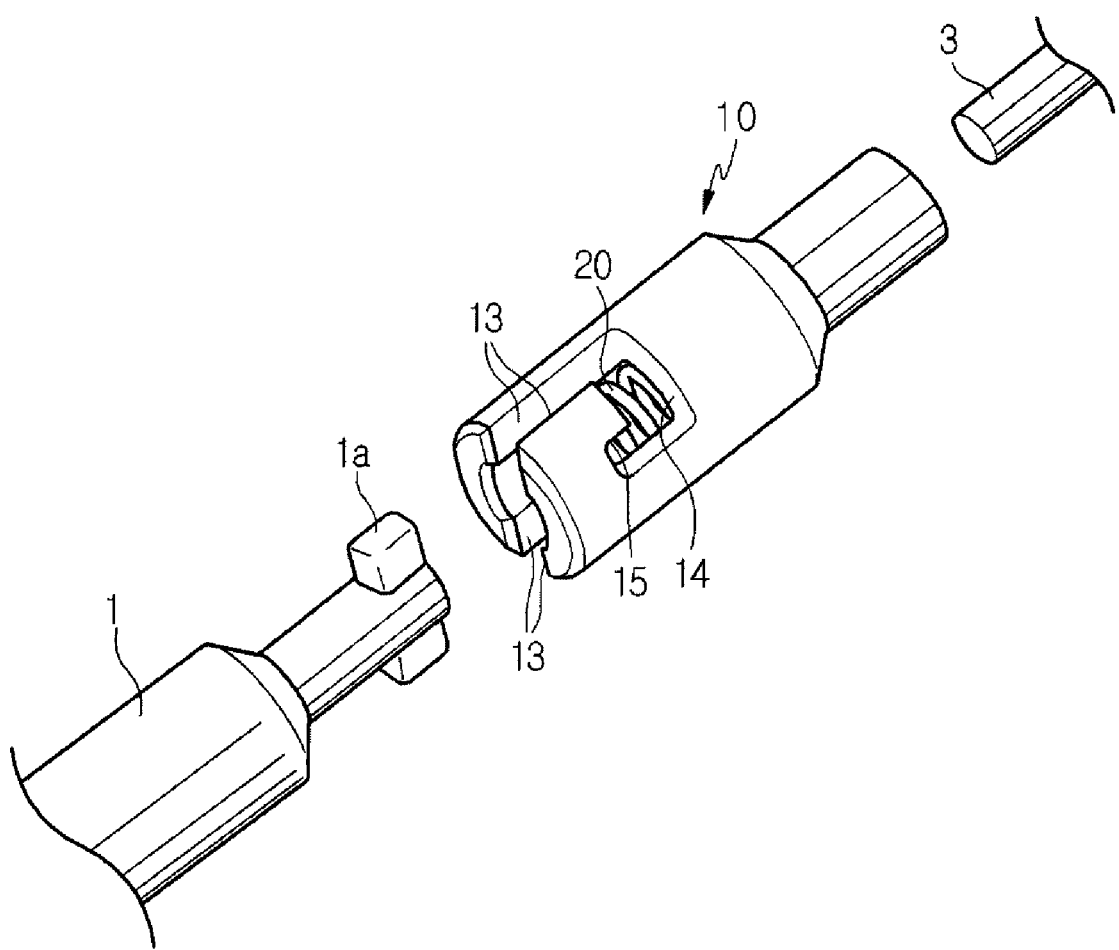
FIGS. 2A to 2C are perspective views illustrating an assembly sequence of a connecting device of a parking cable for an electric parking brake according to the present invention.
Figure 2B:
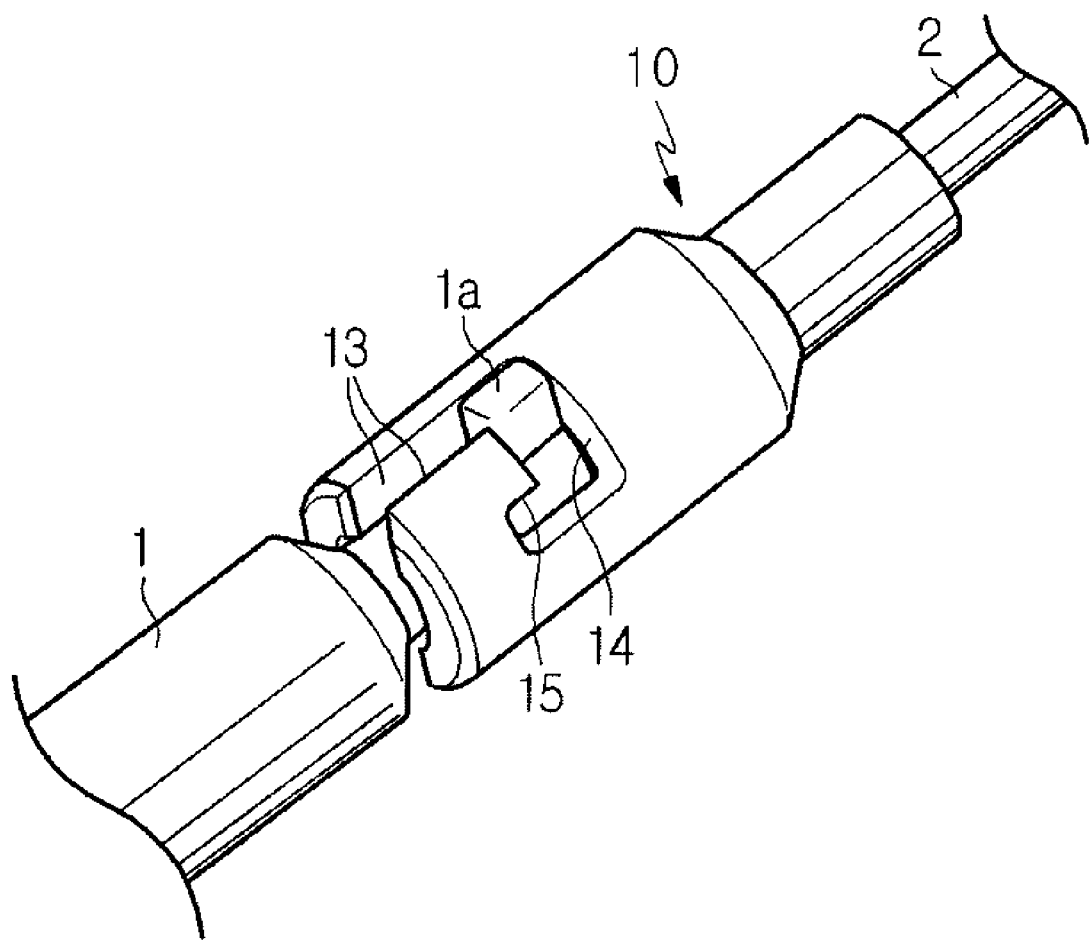
Figure 2C:
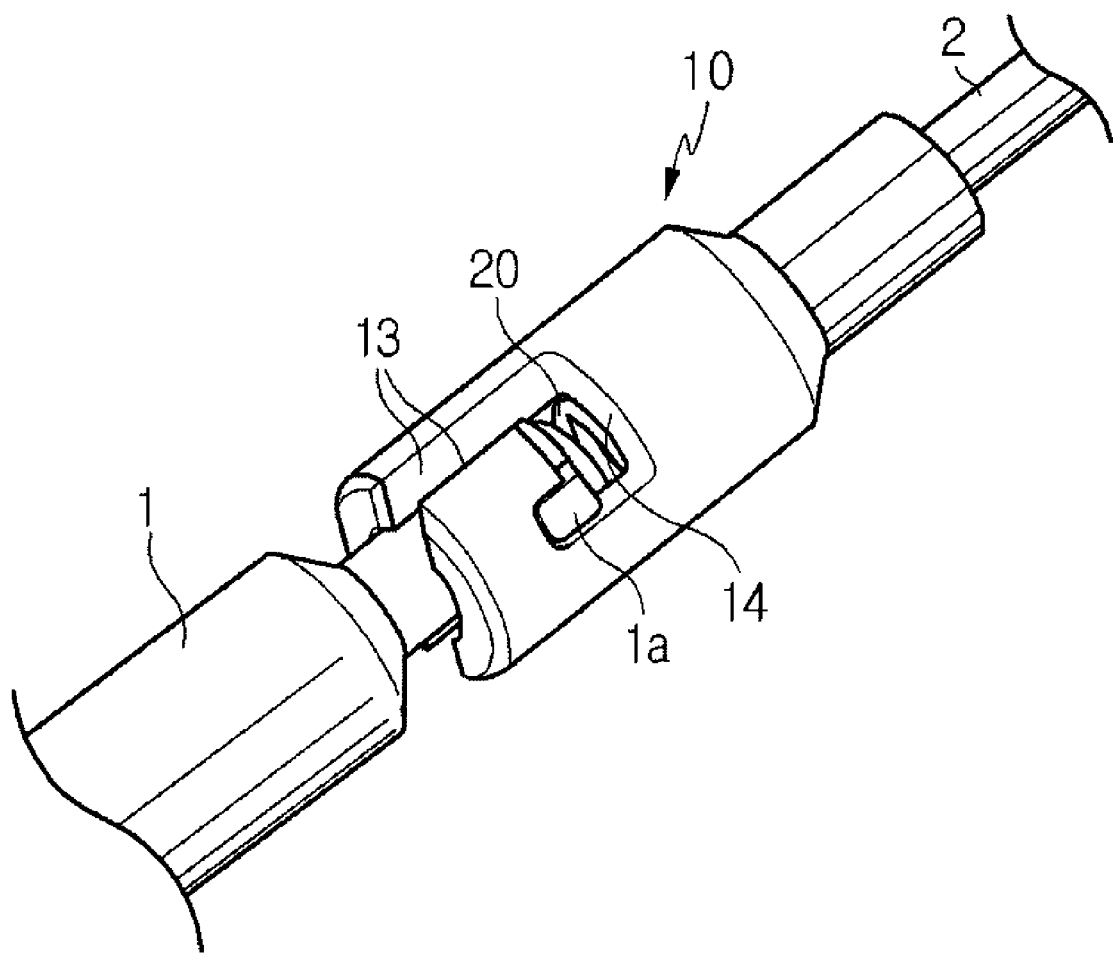

FIG. 1 is an exploded perspective view illustrating a connecting device of a parking cable for an electric parking brake according to the present invention, and FIGS. 2A to 2C are perspective views illustrating an assembly sequence of the connecting device of the parking cable for the electric parking brake according to the present invention.

As illustrated in FIGS. 2A to 2C, the connecting device that connects an actuator 1 for the electric parking brake with a parking cable 2 comprises a connector 10 and a reaction force member 20. The connector 10 comprises a small diameter section 11, a large diameter section 12, an axial cutout slit 13, a circumferential cutout slit 14 and a cutout groove 15. The small diameter section 11 has one side into which an outer peripheral surface of the parking cable 2 is inserted. The large diameter section 12 extends from the small diameter section 11 to have a diameter larger than that of the small diameter section 11. The axial cutout slit 13 is axially formed through the upper and lower surfaces of an outer peripheral portion of the large diameter section 12 such that protrusions 1a circumferentially protruding from an outer peripheral surface of an end of the actuator 1 are inserted into the axial cutout slit 13 through one side of the large diameter section 12. The circumferential cutout slit 14 extends from an inner end of the axial cutout slit 13 by a predetermined length in a circumferential direction. The cutout groove 15 axially extends from the circumferential cutout slit 14. The reaction force member 20 is inserted into the large diameter section 12 of the connector 10 to press the protrusions 1a of the actuator 1 such that the protrusions 1a are seated in the cutout groove 15 through the axial cutout slit 13 and the circumferential cutout slit 14.

The reaction force member 20 includes one selected from the group consisting of a spring, rubber, corrugated rubber and a leaf spring.

Hereinafter, an assembly process of the connecting device of the parking cable for the electric parking brake according to the present invention. First, after an assembly for the electric parking brake is separately assembled and an assembly for the parking cable 2 is separately assembled, the actuator 1 of the parking brake is connected with the parking cable 2 through the connector 10.

In detail, the parking cable 2 is inserted into one end of the small diameter section 11 of the connector 10 and fixed thereto through swaging. The actuator 1 is connected with the large diameter section 12. In detail, the protrusions 1a circumferentially protruding from the outer peripheral surface of one end of the actuator 1 are inserted into the large diameter section 12 through the axial cutout slit 13 of the connector 10 to press the reaction force member 20 in the connector 10. In a state in which the reaction force member 20 is compressed, the protrusions 1a are inserted into the circumferential cutout slit 14 by rotating the protrusions 1a in a circumferential direction of the large diameter section 12. In this state, if the compressive force applied to the reaction force member 20 is released, the protrusions 1a are inserted into the cutout groove 15 due to elastic force of the reaction force member 20.

As described above, the reaction force member 20 elastically operates to maintain a state in which the end of the actuator 1 is seated in the cutout groove 15.

According to the connecting device of the parking cable for the electric parking brake of the present invention as described above, after the electric parking brake assembly is assembled separately from the parking cable assembly, the connecting device is provided between the electric parking brake assembly and the parking cable assembly such that they can be assembled in the vehicle assembly. Thus, the assembly work is facilitated, so the assembly efficiency can be improved and connection work using the connector can be easily performed.

What is claimed is:

1. A brake assembly comprising:
   an electric parking brake cable;
   an electric parking brake actuator; and
   a connecting device for connecting the electric parking brake cable to the electric parking brake actuator, the connecting device comprising:
   (a) a connector, wherein the connector comprises:
      (a1) a small diameter section having one side into which an outer peripheral surface of a parking brake is insertable;
      (a2) a large diameter section that extends from the small diameter section to have a diameter larger than that of the small diameter section;
      (a3) an axial cutout slit axially formed through upper and lower surfaces of an outer peripheral portion of the large diameter section such that protrusions circumferentially protruding from an outer peripheral surface of an end of the actuator are insertable into the axial cutout slit through one side of the large diameter section;
      (a4) a circumferential cutout slit that extends from an inner end of the axial cutout slit by a predetermined length in a circumferential direction; and
      (a5) a cutout groove that axially extends from the circumferential cutout slit, and
   (b) a reaction force member, disposable between the electric parking brake cable and the electric parking brake actuator inside the large diameter section of the connector, for generating an elastic force applicable to the electric parking brake cable and the electric parking brake actuator, wherein the reaction force member is inserted into the large diameter section of the connector to press the protrusions of the actuator such that the protrusions are seated in the cutout groove through the axial cutout slit and the circumferential cutout slit.

2. The brake assembly of claim 1, wherein the reaction force member includes one selected from the group consisting of a spring, rubber, corrugated rubber and a leaf spring.

3. The brake assembly of claim 1, wherein the reaction force member is positionable to be in direct contact with the electric parking brake and the electric parking brake actuator.

* * * * *